United States Patent
Flick et al.

(10) Patent No.: US 10,085,587 B2
(45) Date of Patent: Oct. 2, 2018

(54) APPARATUS AND METHOD FOR PREPARING A BEVERAGE FROM LIQUID SUPPLIED TO A PACKAGE BY A MACHINE

(71) Applicant: Nestec S.A., Vevey (CH)

(72) Inventors: Jean-Marc Flick, Pomy (CH); Heinz Wyss, Oberdiessbach (CH); Youcef Ait Bouziad, Echandens (CH); Yann Epars, La Conversion (CH); Philippe Baenninger, Epalinges (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 15/741,915

(22) PCT Filed: Aug. 22, 2016

(86) PCT No.: PCT/EP2016/069782
§ 371 (c)(1),
(2) Date: Jan. 4, 2018

(87) PCT Pub. No.: WO2017/032731
PCT Pub. Date: Mar. 2, 2017

(65) Prior Publication Data
US 2018/0192813 A1     Jul. 12, 2018

(30) Foreign Application Priority Data
Aug. 25, 2015 (EP) .................................... 15182341

(51) Int. Cl.
*A47J 31/00* (2006.01)
*A47J 31/40* (2006.01)
(Continued)

(52) U.S. Cl.
CPC ............... *A47J 31/407* (2013.01); *A23L 2/50* (2013.01); *A47J 31/3623* (2013.01);
(Continued)

(58) Field of Classification Search
CPC .... A47J 31/405; A47J 31/467; A47J 31/3623; A47J 31/3633; A47J 31/3642
(Continued)

(56) References Cited

U.S. PATENT DOCUMENTS

2004/0182251 A1    9/2004 Halliday et al.

FOREIGN PATENT DOCUMENTS

EP    2236437 A1    10/2010
ES    2525250 A1    12/2014
(Continued)

OTHER PUBLICATIONS

International Search Report, dated Nov. 10, 2016, in PCT/EP2016/069782, filed Aug. 22, 2016.
(Continued)

*Primary Examiner* — Reginald L Alexander
(74) *Attorney, Agent, or Firm* — Dunlap Codding, P.C.

(57) ABSTRACT

An apparatus for preparing a beverage by delivering sanitized liquid within a package containing nutritional ingredients. The apparatus includes a package comprising a product compartment containing nutritional ingredients and a spout arranged for the supply of liquid inside the compartment. The apparatus also includes a machine comprising a control unit and a liquid supply and treatment unit. Methods of production and use thereof are also disclosed.

15 Claims, 9 Drawing Sheets

(51) Int. Cl.
*A23L 2/50* (2006.01)
*A47J 31/36* (2006.01)
*B67D 1/07* (2006.01)
*A47J 31/60* (2006.01)
*A47J 31/46* (2006.01)

(52) U.S. Cl.
CPC ......... *A47J 31/3633* (2013.01); *A47J 31/405* (2013.01); *A47J 31/3642* (2013.01); *A47J 31/467* (2013.01); *A47J 31/60* (2013.01); *B67D 1/07* (2013.01)

(58) Field of Classification Search
USPC .............................. 99/275, 289 R, 290, 295
See application file for complete search history.

(56) References Cited

FOREIGN PATENT DOCUMENTS

| | | |
|---|---|---|
| JP | 2000348249 A | 12/2000 |
| WO | 2002091903 A2 | 11/2002 |
| WO | 2004065225 A2 | 8/2004 |
| WO | 2009027131 A1 | 3/2009 |
| WO | 2010112353 A1 | 10/2010 |
| WO | 2010128051 A1 | 11/2010 |
| WO | 2012066313 A2 | 5/2012 |
| WO | 2017032734 A1 | 3/2017 |

OTHER PUBLICATIONS

Written Opinion of the International Searching Authority, dated Nov. 10, 2016, in PCT/EP2016/069782, filed Aug. 22, 2016.

International Search Report, dated Oct. 20, 2016, in PCT/EP2016/069786, filed Aug. 22, 2016.

Written Opinion of the International Searching Authority, dated Oct. 20, 2016, in PCT/EP2016/069786, filed Aug. 22, 2016.

APPARATUS AND METHOD FOR PREPARING A BEVERAGE FROM LIQUID SUPPLIED TO A PACKAGE BY A MACHINE

CROSS-REFERENCE TO RELATED APPLICATIONS/INCORPORATION BY REFERENCE STATEMENT

This application is a U.S. national stage application filed under 35 USC § 371 of International Application No. PCT/EP2016/069782, filed Aug. 22, 2016; which claims priority to EP App No. 15182341.6, filed Aug. 25, 2015. The entire contents of the above-referenced patent applications are hereby expressly incorporated herein by reference.

TECHNICAL FIELD

The present disclosure relates to an apparatus and method for preparing a beverage such as a nutritional liquid composition in a safe and hygienic manner. In particular, the apparatus comprises a package containing nutritional ingredients, such as an infant formula, milk- or soya-based ingredients, and a machine for receiving and connecting the package to a liquid supply; the liquid being associated with the nutritional ingredients in the package for preparing the beverage, such as a ready-to-drink infant formula composition.

BACKGROUND

Nowadays, machines or systems for preparing nutritional beverages by mixing nutritional ingredients with liquid, usually water, are frequently used for in-home and out-of-home applications and should develop further for feeding patients in hospitals or clinics.

When preparing certain beverages for more fragile persons such as infants, toddlers, patients or seniors, it is important to ensure that the liquid to mix with the product ingredients and supplied by the machine is safe on a microbiological point of view, each time the machine is used. Liquid can contain undesired contaminants such as microorganisms or viruses for example. These undesired contaminants should be removed or neutralized from the liquid before the liquid is mixed with the nutritional ingredients contained in the package.

A particular problem can be called the "last mile". The "last mile" is actually a part of the system between the sanitizing area in the machine and the mixing or reconstitution point in the package that may not be properly decontaminated or sanitized. Such a portion can be a more or less small portion of surface, a conduit, a needle and the like.

U.S. Pat. No. 6,118,933 relates to an apparatus or method for preparing infant formula from powder with dispensing and filtering means. The apparatus comprises a reservoir for holding a supply of water, a heating element for heating well in advance water at a temperature suitable for being safely fed to a baby, a baby bottle positioned for receiving water dispensed from the reservoir through a spigot and a supply of powdered formula for immediately mixing with water dispensed from the reservoir through the spigot. The apparatus further comprises means for disinfecting including a ultra-violet (UV) lamp disposed within the reservoir or means for filtering the bacteria from the water within the flow path between the pump and the spigot. Such system is not very convenient as it requires the user to dose the right amount of powder in the baby bottle but more importantly, it is not so safe because the spigot itself may be contaminated and vehicle contaminants in the water passing therethrough.

EP2046398 relates to a dispenser for preparing a nutritional composition comprising a reservoir, water heating means and water discharge means wherein a bacterial filter is provided between the water heating means and the water discharge means such that heated water passes the filter prior to discharge from the dispenser. A steam generator is further provided such that the interior of the water discharge means and/or filter surface may be cleaned by the passage of steam during each cycle.

EP2134222 relates to an apparatus for producing a drink, for example milk, configured to prepare the drink concentrate by mixing the amount of formula (P) necessary for the total amount of drink in a certain amount of hot liquid having a temperature in the range of 60-80° C., and to add the right amount of liquid of a certain low temperature to the concentrate in order to reach the end volume of the drink at safe drinking temperature. The apparatus further comprises a radiation system comprising an UV-lamp and a UV-transparent tube such that during operation the tube contains the lamp flowing around, or the liquid flows through a tube with the UV-radiation coming from the outside.

WO 2009/027131 relates to a dispensing device for preparing and dispensing nutritional composition from a capsule containing nutritional ingredients comprising a water circuit, a water heater, an injection head comprising intruding part for injecting water in the capsule comprising the ingredients; a capsule holder for holding the capsule during injection of water in the capsule, wherein it comprises cleaning and/or sanitizing means arranged to inject a cleaning agent in at least a portion of the water circuit and through the injection intruding part, and collecting means which can be associated in engagement with the injection head for enabling the collecting means to collect and discard the cleaning agent after it has passed through the injection intruding part.

WO2009/092629 relates to a capsule for nutritional beverage with an integrated antimicrobial filter.

EP2236437 relates to a capsule for a nutritional beverage with an antimicrobial filter and furthermore a flow collection member placed downstream of the filter to collect the filtered liquid and for producing a jet of liquid at high velocity in the compartment containing the ingredients.

WO2010/128028, WO2010/128031, WO2010/128051 relate to a capsule with an integrated filter unit further comprising an air inlet and conduit for enabling residual liquid to be removed from the capsule to ensure emptying of the capsule and a full dispensed feed.

The problem of the capsules with integrated filter lies in the complexity of the capsule and the filter material cost and production cost which are very high.

Therefore, there is a need for an apparatus that has a simpler, lower cost package but remains safe for preparing a beverage, in particular, by solving the "last mile" issue and having, each time a beverage is prepared, only cleansed liquid supplied to the package.

DETAILED DESCRIPTION

Figure 1:
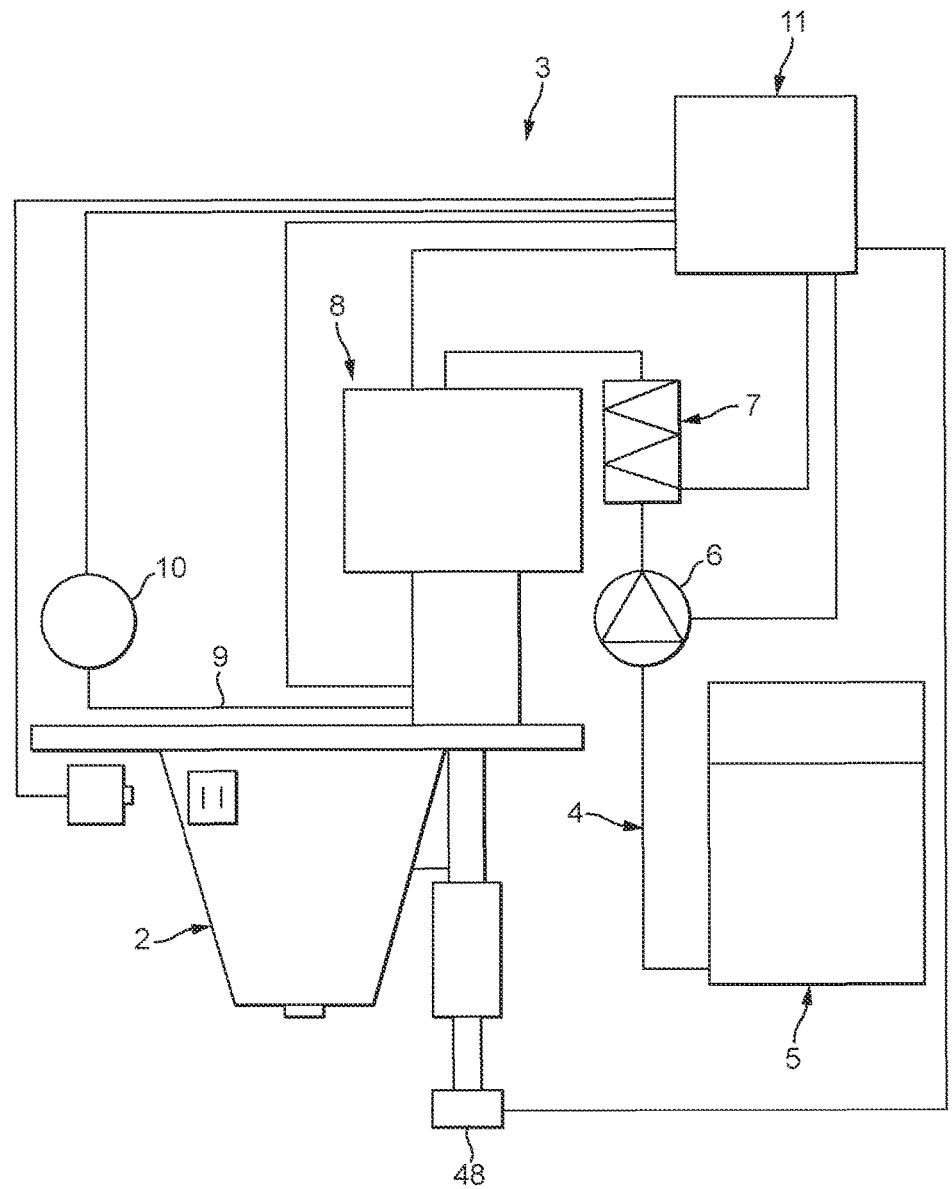
FIG. 1 represents a schematic view of a mode of the apparatus of the present disclosure

The present disclosure provides a solution to the need(s) and alleviates the mentioned problem(s).

For this the present disclosure relates to an apparatus according to claim 1. The dependent claims further define the apparatus of the present disclosure. The present disclosure also relates to a method according to the appended claims related to the same.

The apparatus of the present disclosure comprises:
i) a package comprising a product compartment containing nutritional ingredients and a spout arranged for the supply of liquid inside the compartment and
ii) a machine comprising:
 (a) a control unit,
 (b) a liquid supply and treatment unit comprising an optical irradiation chamber arranged for sanitizing liquid circulating therein and a connection assembly for fluidly connecting the liquid supply and treatment unit with the package;
iii) wherein the spout comprises a fluid connector, with a liquid inlet, insertable through the connection assembly of the liquid supply and treatment unit; and,
iv) wherein the fluid connector is positioned after insertion through the connection assembly in a position of insertion in which the liquid inlet is exposed to the optical irradiation field produced by the optical irradiation chamber.

In particular, the liquid inlet can be arranged at the tip of the fluid injector.

The connection assembly may further comprise a bushing for the liquid connector to be inserted through. The fluid connector and bushing may be designed and dimensioned relative to one another such that at least the tip of the fluid connector is positioned after insertion in a position of insertion in which it is exposed to an optical irradiation field produced by the optical irradiation chamber.

Therefore, liquid can be irradiated before entering the package and the critical surface of the package interfacing with liquid can be cleansed to avoid risk of contamination.

In certain non-limiting embodiments, the fluid connector comprises a liquid inlet arranged at said tip; said liquid inlet being exposed to the optical irradiation field in the treatment insertion position. Therefore, no untreated surface is allowed between the irradiation chamber and the first entry of liquid in the package.

More particularly, the optical irradiation chamber comprises a tube for liquid to pass there-through and being irradiated from outside by an irradiating member and wherein the bushing is positioned through an outlet end of the duct and the duct comprising at least one liquid inlet at an inlet end. In certain particular (but non-limiting) embodiments, the irradiating member is at least one UV lamp or LED. It can be an array of several LEDs. Therefore, the irradiation chamber is built as an in-line treatment device for liquid. Liquid circulates through the chamber so that the duration of the beverage preparation remains short. The irradiation power, size and/or number of UV lamps can be determined for example according to the desired flow rate of liquid that circulates and to the preparation time.

In a particular (but non-limiting) mode, a valve is provided to fluidly close the bushing when the fluid connector is not inserted through the connection assembly and fluidly open the bushing for insertion of the fluid connector through the connection assembly. The advantage is that the chamber can be selectively closed before and/or after connection of a new package which gives opportunity to irradiate and so cleanse liquid in the chamber before it is supplied to the package.

The valve is also arranged so that its surface in contact with liquid can also be sanitized in the chamber. In particular, the valve is movable between a closed position and an open position of the bushing and is exposed when moved in opening of the bushing to the optical irradiation field produced by the optical irradiation chamber. The formation of a biofilm can be successively prevented, for example, when the machine is not used for a prolonged period of time. The preparation time of the beverage is also reduced because liquid in the chamber can be cleansed in advance of its supply to the package.

More particularly, the bushing comprises at least one annular sealing surface portion snug fitted to a complementary sealing surface portion of the fluid connector for providing a liquid-tight sealing engagement of the fluid connector when it is inserted through the connection assembly. In certain non-limiting embodiments, the bushing further comprises a flared surface portion that extends from the sealing surface portion towards the inside of the optical irradiation chamber. Such flared surface portion thereby forms a reflecting surface disengaged from the tip of the fluid connector. The flared surface portion further helps to cleanse the fluid connector by providing reflection of the radiation impacting the surface of the connector. It also avoids acute surface angles where biofilm could settle and would be less easy to remove.

In certain particular (but non-limiting) embodiments, the spout comprises a tubular housing which is arranged with the fluid connector to guide the fluid connector in displacement between a storage position in which the connector is sealingly enclosed in the housing and an insertion position in which the fluid connector extends beyond the housing for enabling at least the tip of the fluid connector to be exposed to the optical irradiation chamber. One advantage is that the fluid connector can be hygienically protected from contaminants in the package before the first use and be extended for connection, when required, with the machine. This telescopic configuration also provides the advantage that the package size can remain compact.

In certain non-limiting embodiments, the fluid connector is sealingly arranged inside the housing in aseptically stored condition. By "aseptically stored condition" it is meant that the fluid connector and the interior of the housing are essentially free of microorganisms. Such condition is obtained by appropriate aseptic operation(s), including treatment, assembling and filling, such as by use of oxygen peroxide, UV radiation, alcohol, heat or steam, aseptic gas flowing/flushing, and combinations thereof.

In a mode, the housing may be configured at least partially as a guiding tube for housing the fluid connector, with a front end opening for enabling the frontal portion of the connector to extend beyond the housing in the insertion position and a rear end opening forming a passage to a pusher of the machine for enabling the pusher to push a distal end of the connector (opposed to said tip) so that the connector can be moved into the insertion position. Furthermore, the front end and/or rear end opening can be sealed by a breakable, tearable or removable sealing part, such as (but not limited to) a membrane.

In an alternative non-telescopic mode, the spout can be arranged stationary relative to the spout and form an elongated needle of sufficient length to be inserted through the connection assembly of the machine.

In the particular (but non-limiting) telescopic mode, the connector comprises at least one liquid outlet which matches with a liquid inlet of the tubular housing when the connector is placed into the insertion position; said liquid inlet communicating with the product compartment of the package via a liquid conduit to provide liquid communication between the liquid supply and treatment unit and the product compartment.

The machine further comprises a liquid reservoir, a liquid pump and a control unit for controllably supplying liquid to the liquid supply and treatment unit. The control unit control the activation of the irradiating member, e.g., UV lamp(s) or LED(s). The control of irradiation can be time based. The control unit can control the opening and closing of the valve of the irradiation chamber. For this, the valve can be part of an actuation member, such as a motor, which is activated by the control unit.

The control unit can also control the pusher, e.g., linked to a motor, of the machine to move the fluid connector from the storage position to the insertion position. The opening of the valve by the control unit can be synchronized with the insertion of the connector through the connection assembly so that the opening of the bushing is disengaged from the valve when the fluid connector is inserted through.

The machine further may comprise a pressurized air pump and an air injector to inject air into the product compartment for emptying the product compartment from supplied liquid. The compressed air pump is also controllable by the control unit of the machine to cycle it after liquid being supplied to the package.

The present disclosure further relates to a method for preparing a beverage according to the apparatus of the present disclosure wherein the liquid supply and treatment unit is arranged to irradiate liquid with UV radiation as liquid passes through the unit and wherein it comprises irradiating at least the tip of the fluid connector when inserted through the connection assembly of the supply and treatment unit.

The method further comprises maintaining the irradiation chamber closed and controllably irradiating liquid in the chamber for a controlled period of time before insertion of the fluid connector. As a result, cleansed liquid is supplied to the package and the beverage preparation time is reduced.

The method further comprises controllably irradiating liquid in the chamber while supplying liquid to the spout of the package. The advantage is that preparation of the beverage is reduced and the apparatus remains compact as liquid is treated in line in the machine. There is no need for any buffer reservoir of treated liquid since once irradiated, liquid is directly/continuously supplied to the package.

Furthermore, the method comprises controllably stopping irradiating liquid in the chamber once the fluidic connector is under storage position to ensure that no contaminated liquid can flow in the package. Therefore, only necessary liquid for the beverage preparation is irradiated. This is also possible because the irradiation chamber and package are directly connected. The consumption of electrical energy is consequently kept low.

The method comprises controllably supplying pressurized air to the package when or after stopping supplying liquid to the spout. The advantage is that all the residual liquid in the package can be dispensed thereby properly controlling the beverage volume and nutritional content delivered.

The present disclosure also relates to a machine for preparing a beverage by delivering sanitized liquid within a package containing nutritional ingredients comprising a product compartment containing nutritional ingredients and a spout arranged for the supply of liquid inside the compartment;
 i) the machine comprising:
  (a) a control unit,
  (b) a liquid supply and treatment unit comprising an optical irradiation chamber arranged for sanitizing liquid circulating therein and a connection assembly for fluidly connecting the liquid supply and treatment unit with the package;
 ii) wherein the spout comprises a fluid connector, with a liquid inlet, insertable through the connection assembly of the liquid supply and treatment unit;
 iii) wherein the optical irradiation chamber comprises a tube for liquid to pass there-through and for being irradiated from outside by an irradiating member and wherein the connection assembly comprises a bushing for the liquid connector to be inserted through; and,
 iv) wherein the fluid connector and bushing are designed and dimensioned relative to one another such that at least the liquid inlet of the fluid connector is positioned after insertion in a position in which it is exposed to an optical irradiation field produced by the optical irradiation chamber.

The appended drawings are given as a matter of non-exhaustive illustration of particular (but non-limiting) embodiments.

A general representation of the apparatus of the present disclosure is visible on FIG. 1. The apparatus 1 is designed to prepare a beverage, such as infant formula liquid, by delivering cleansed or sanitized liquid within a package 2, e.g. a capsule, containing nutritional ingredients such as infant formula or milk powder. The apparatus generally comprises a machine 3. The package and machine are connectable together to allow the machine to controllably supply liquid in the package, at controlled temperature and volume; such liquid mixing with the nutritional ingredients to prepare the beverage. Liquid is generally water. The beverage is then dispensed from the package 2 into a recipient such as a baby bottle (not represented). Dispensing of the beverage may be produced by opening the package such as under the effect of pressure inside the package and/or by passing beverage through a filter located in the bottom of the package.

The machine generally comprises a liquid circuit 4 comprising a liquid reservoir 5 connected to a pump 6 and a liquid heater 7. The liquid circuit supplies liquid at controlled temperature to a liquid supply and treatment unit 8. The machine may further comprise a pressurized air circuit 9 with an air pump 10 or any other controllable air supply such as a compressed air reservoir (e.g., air cartridge) and a controllable valve. A control unit 11 is also provided to control all these active elements of the machine as will be described later. The apparatus may also optionally comprise a package recognition system having a code recognition device 12 as part of the machine and a code 13 arranged on package. The system can provide data input to the control unit to adjust output to operate specifically certain elements of the machine. The code can be a barcode for example and the code recognition device can be an infrared reader or similar.

Figure 2:
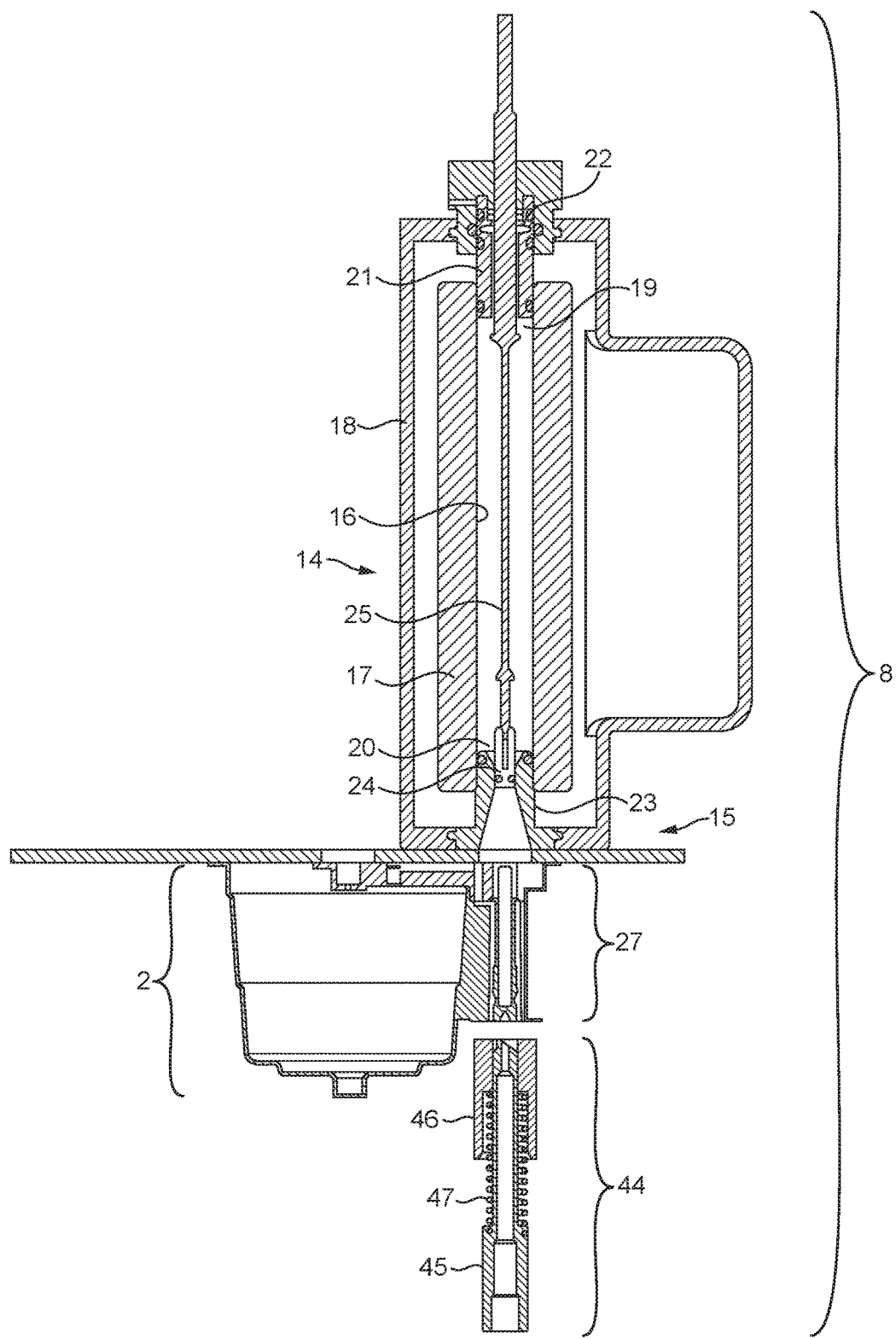
FIG. 2 represents part of the apparatus of the present disclosure in particular the liquid supply and treatment unit and the package connected thereto.

FIG. 2 focuses on the connection of the package with the liquid supply and treatment unit 8. The liquid supply treatment unit 8 generally comprises an optical irradiation chamber 14 configured for cleansing/sanitizing liquid passing or circulating therein and a connection assembly 15 for fluidly connecting the liquid supply and treatment unit with the package 2.

The optical irradiation chamber 14 generally comprises a tube 16 for guiding liquid and an irradiating member 17. In certain non-limiting embodiments, the irradiating member is a lamp delivering ultraviolet light (UV) towards the interior of the tube. The UV emission is controlled by the control unit to be effective for sanitizing liquid circulating in the tube. The tube is transparent to UV and may be constituted as a part separate of the irradiated member or an integrated wall thereof. On the outside, the optical irradiation chamber 14 may comprise a protective casing 18 which is opaque to the UV radiation.

As an example, the optical irradiation chamber can use discharge plasma technology. The UV lamp contains a gas such as xenon for the generation of an electromagnetic wave that emits UV in the range of 260 to 280 nm. This lamp provides advantages compared to standard UV lamp as it is more compact, instantaneously efficient and shows high UV efficiency and microbial inactivation rate compared to standard (mercury) UV lamp thanks to the generated pulses and spectral difference in the UV output. However, other UV irradiation technology could be used as possible alternatives such as LEDs.

Figure 6:
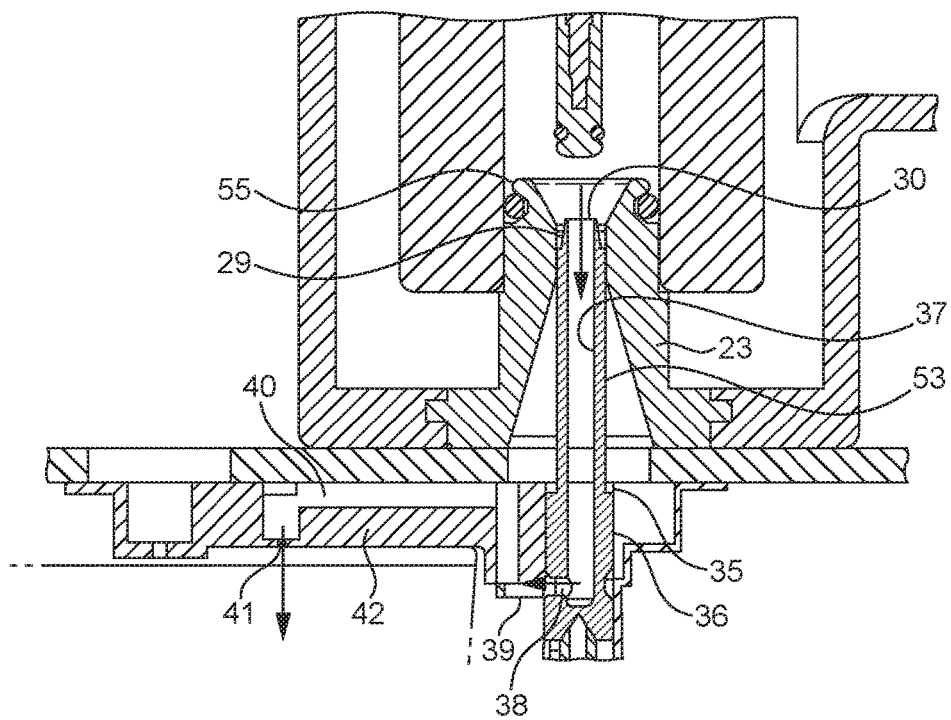
FIG. 6 is an enlargement view of FIG. 5.

The optical irradiation chamber 14 further comprises an inlet end 19 for liquid to enter the chamber and an outlet end 20 for liquid to exit the chamber. At the inlet end, a (inlet) bushing 21 may be provided with liquid inlet(s) 22 connected to the liquid circuit 4. On the outlet end 20 of the tube, a (outlet) bushing 23 is provided with a flow passage for direct connection of the package as described later. In certain non-limiting embodiments, the bushing is made of a material that reflects UV radiation such as stainless steel or similar material. The bushing 23 may also advantageously serve as an electrode for measuring the conductivity of liquid and so controlling if the tube is properly filled with liquid. In certain non-limiting embodiments, the chamber 14 comprises a valve 24 which is provided to fluidly close the bushing 23. The valve can be actively controlled by the control unit for closing and opening the tube. In particular, in certain non-limiting embodiments, the bushing is connected to an activation rod 25 which can be advantageously a movable ground electrode of the discharge plasma UV lamp. The rod or electrode may be connected at its rear or external part to a motor (not shown) that can move the valve 24 reciprocally in at least two positions; a closing position where the valve sealingly engages the bushing 23 in closure of its flow passage and an open position where the valve is moved away (i.e. retracted) from the bushing. In FIG. 2, the bushing is closed by the valve and so is the irradiation chamber. In such configuration, the irradiation chamber can be irradiating liquid contained in the tube or be switched off. Liquid tightness between the bushing can be obtained by a partially open cavity 55 receiving an O-ring gasket (FIG. 6). The form of the cavity enables the flushing with sanitized liquid and reduces the risk of biofilm forming in this area. The same sealing principle can be applied on the inlet bushing 21.

The irradiation chamber 14 may further comprise a flow homogenizer 54 within the tube 16 to avoid a stratification of the fluid passing through the chamber. For example, the flow homogenizer may be a screen disk mounted on the central ground electrode 25.

Figure 9:
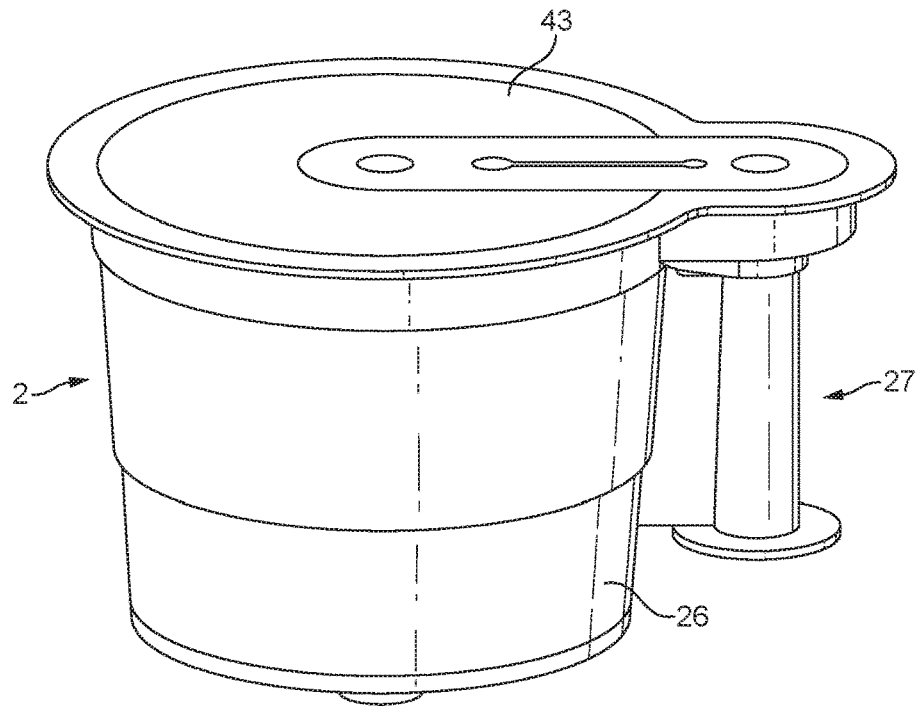
FIG. 9 is a perspective view of a package of the apparatus, in particular, a beverage capsule.
Figure 10:
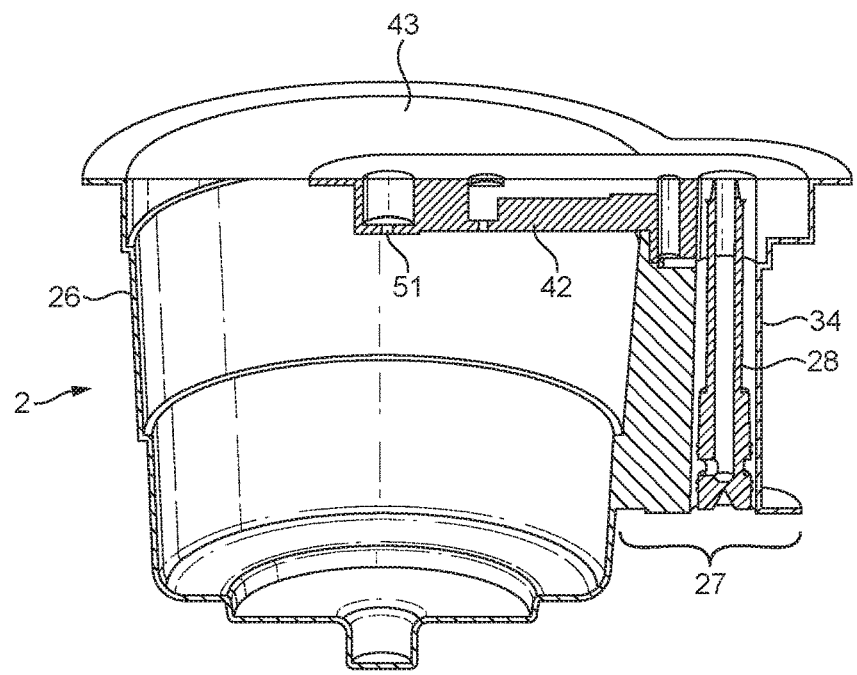
FIG. 10 is a cross-section view of the package of FIG. 9.

One example of package 2 which is connectable to the machine is visible on FIGS. 2, 9 and 10. Package 2 can be formed as a single-use beverage capsule for example. The capsule generally comprises a product compartment 26 which contains nutritional ingredients and a spout 27. The compartment 26 and spout 27 can be closed by a lid 43. The spout comprises fluid connector 28 arranged to be displaceable in a housing 34. The fluid connector is elongated and guided in a substantially tubular housing 34. The package is configured such that the fluid connector forms the entry point for liquid. In particular, the fluid connector comprises a tip 29 with a liquid inlet 30. In particular, the fluid connector can be displaced between a storage position of FIGS. 2 and 10 in which the connector is fully encased in the housing and a treatment or extended position (or deployed) in which at least part of the connector extends beyond the housing for enabling at least part of the tip 29 of the connector to be inserted in the liquid supply and treatment unit 8. When the fluid connector is displaced into the position of insertion through the unit 8, the lid 43 is opened such as by breaking or puncturing. However, it would be possible that part of the lid can be removed, e.g. peeled off to allow the extension of the fluid connector.

Figure 4:
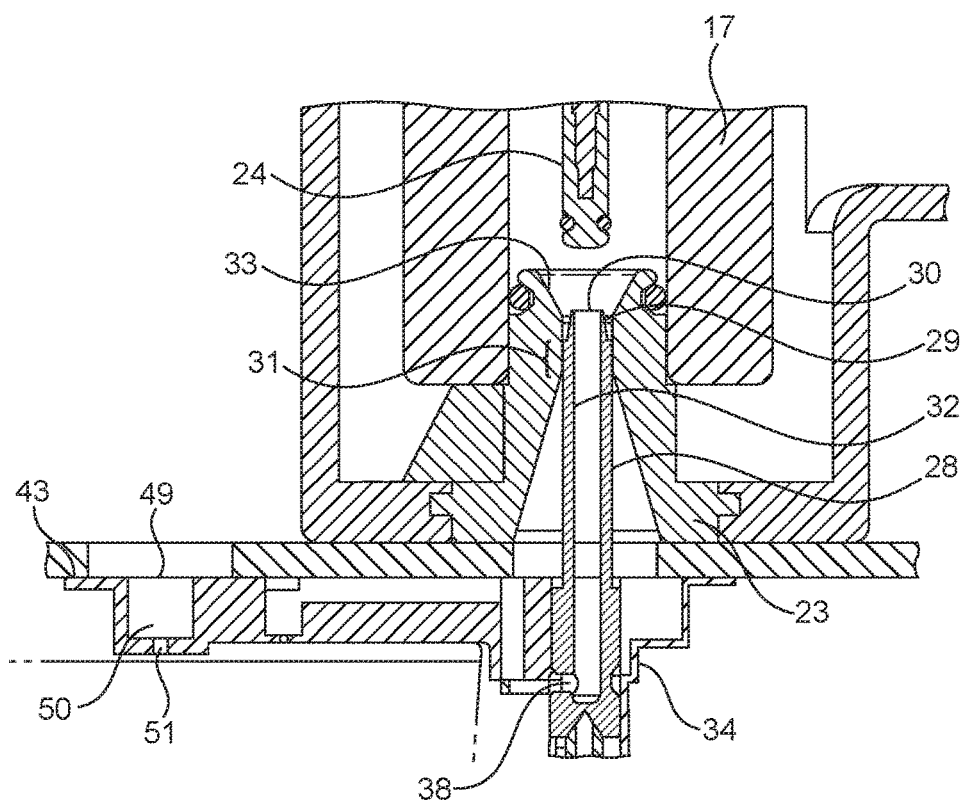
FIG. 4 is an enlargement view of FIG. 3.

FIG. 4 shows the package connected to the liquid supply and treatment unit with the fluid connector 28 being inserted through the bushing 21 and its tip 29, as well as the liquid inlet and the valve 24, being exposed to the UV irradiation field in the tube. In such position of insertion, the tip of the connector, the liquid inlet and the valve 24 in the chamber can be de-contaminated.

Figure 3:
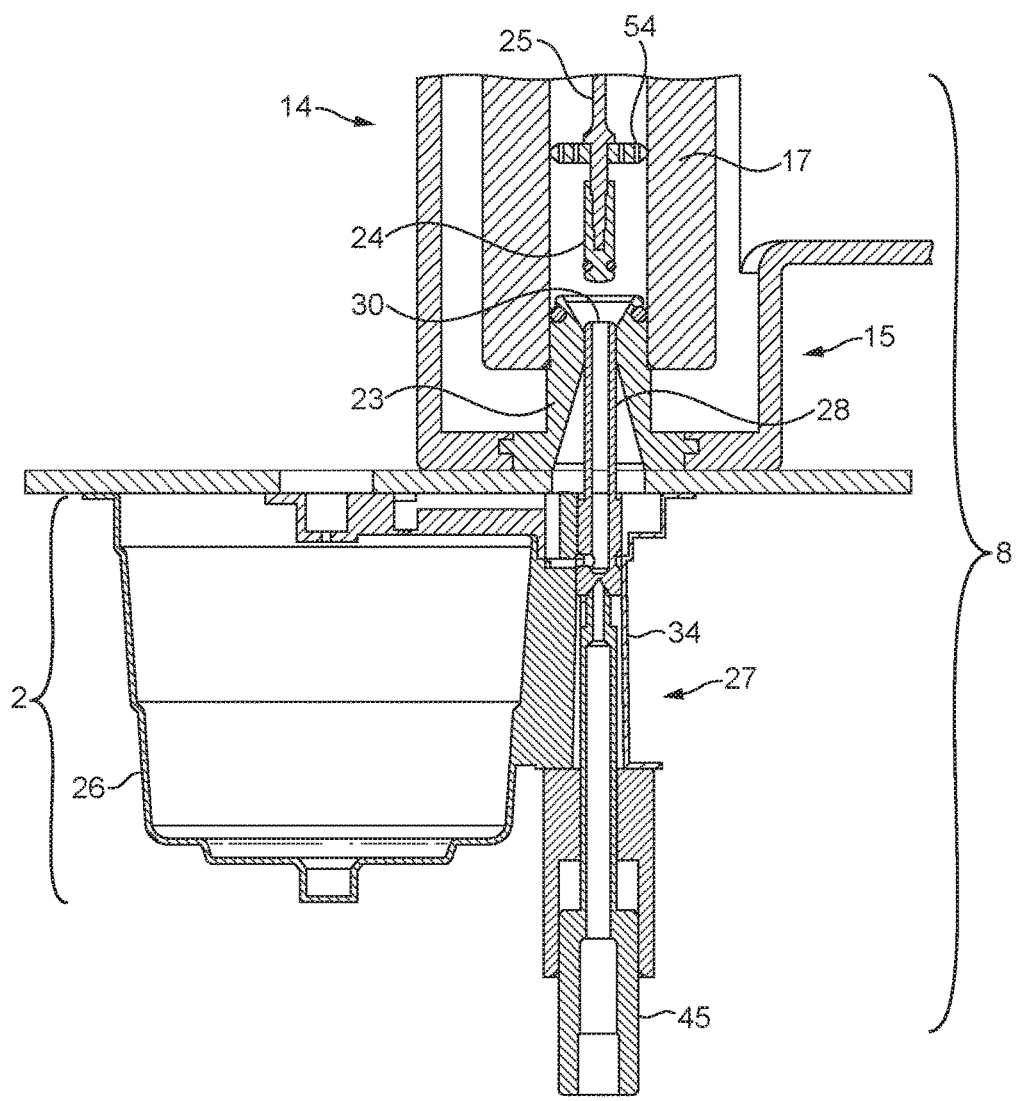
FIG. 3 represents part of the apparatus in the UV treatment position of the fluid connector and valve.

In certain non-limiting embodiments, the bushing 23 comprises at least one annular sealing surface portion 31 that is arranged to snugly fit to a complementary sealing surface portion 32 of the fluid connector for providing a liquid-tight sealing engagement of the fluid connector when inserted as shown in FIG. 3 or 4. The bushing further comprises a flared surface portion 33 that extends from the sealing surface portion 31 towards the inside of the optical irradiation chamber or tube. This flared shape of the surface portion 33 enables to reflect and diffract the UV rays and maximize the exposure of the valve 24 and tip of the connector.

Figure 5:
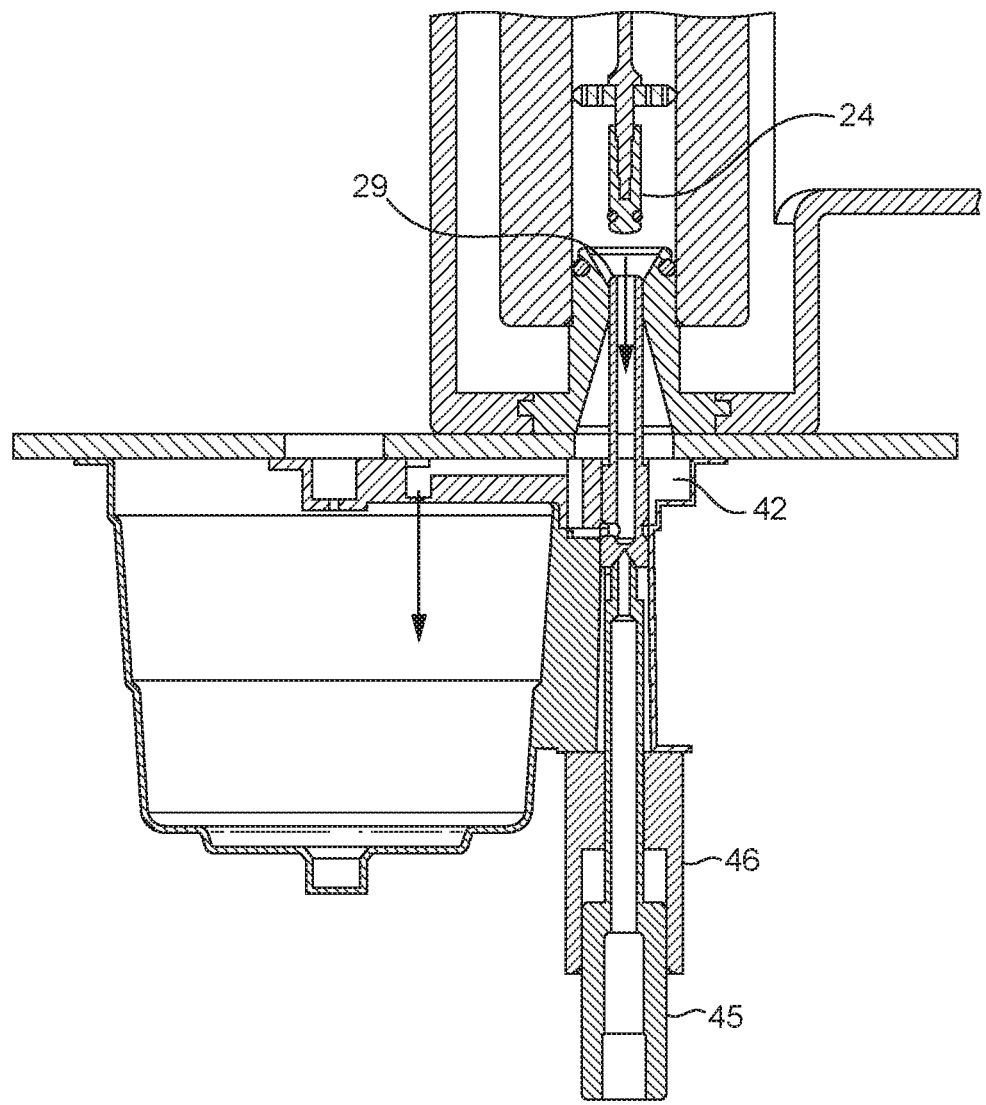
FIG. 5 represents part of the apparatus in the liquid dispensing mode.

In FIGS. 5 and 6, is illustrated the liquid dispensing mode. The fluid connector remains inserted through the bushing with, in certain non-limiting embodiments, its tip 29 being still exposed to the UV radiation emitted by the irradiation member. In certain non-limiting embodiments, the fluid connector is in the same position relative to the housing than in the treatment position of FIGS. 3 and 4. The fluid connector comprises a frontal portion 53 of needle that actually defines a length of the fluid connector extending telescopically beyond the housing. An abutment 35 can be provided to determine the position of the fluid connector in extension. The abutment can, for example, an annular edge of a base portion 36 of larger diameter than the diameter of the needle portion 53. The fluid connector comprises an axial conduit 37 extending longitudinally from the liquid inlet 30 to a liquid outlet 38.

When the fluid connector is in the liquid dispensing position, the liquid outlet 38 matches with a liquid inlet 39 of the housing. Such liquid inlet communicates with the product compartment 26 via a liquid conduit 40. The liquid conduit ends by one (or several) liquid outlet 41, which in certain non-limiting embodiments, is of very small size or diameter, e.g., lower than 1 mm of diameter. The liquid inlet 39, liquid conduit 40 and liquid outlet 41 may be formed at least partially by an additional member such as a guiding insert 42 of the spout.

For the fluid connector to be moved between the storage position and the extension position, the machine comprises an actuating mechanism 44 which actuation is controlled by the control unit (FIG. 2). The mechanism comprises a pusher 45 arranged in a guide 46 in reciprocal translation. A return spring 47 is mounted between the pusher and guide to return the pusher in rest position. The pusher is pushed by a motor or similar actuator 48 which is driven by the control unit (FIG. 1).

Possibly, the fluid connector comprises a filtering means to filter liquid (not illustrated). The filter may be a filter for filtering contaminants and/or solid particles contained in liquid.

The package may be further designed for allowing supply of pressurized air for emptying the compartment after liquid dispensing. For this, a specific air flow path can be arranged in the package which is connectable with the air circuit 9 of the machine. The flow path in the package can be designed in a very different manner and the one illustrated in FIGS. 7, 9 and 10 forms only one possible example. In such example, the guiding insert 42 comprises an air inlet 49, an air conduit 50 and an air outlet 51. In certain non-limiting embodiments, the air inlet is closed by the lid 43 of the capsule. On the machine, the air circuit can be provided with an air needle (not shown) that is moved to break or perforate the lid and engage in the conduit 50.

A particular (but non-limiting) mode of the method for preparing a beverage will now be described in relation to FIG. 8 and also in relation to FIGS. 2 to 7.

The package is initially received in a predetermined position in the machine such in a package holder (not shown).

In the position of FIG. 2, an optional package recognition mode can be implemented after the machine has been powered. This mode may be advantageous to simplify the human-user-interface of the machine, to ensure that a package is well in place in the machine and to initially cleanse/sanitize the liquid in the liquid supply and treatment unit 8. Once the capsule is recognized and the code data transferred to control unit, the operational algorithm is run by the control unit as follows.

A start step 60 is generated in the algorithm of FIG. 9.

In next step 61, the actuating mechanism 42 can be actuated so that the pusher locks the fluid connector by its free end perforating the membrane of the housing 34 and engaging the distal end of the connector.

In step 62, the irradiation member 17 is powered on to start irradiating liquid already contained in the tube 16. The chamber is maintained closed by the valve 24 obstructing the bushing 23.

In step 63, time elapsed from the start of the irradiation is controlled by a timer of the control unit and checked in test 64. For example, time may be between 2-10 seconds.

When time elapsed, the control unit opens the valve 24 in step 65. The irradiation member continues to irradiate liquid. In step 66, the pusher of the actuation mechanism 44 then pushes the fluid connector in its insertion position of FIGS. 3 and 4. The tip of the fluid connector is thereby positioned for being cleansed by the emitted UV rays. In step 67, time elapsed from the positioning of the fluid connector is controlled and checked in a second test 68. Time may be for example between 1 and 5 seconds. When time elapsed, pump 6 is powered on so that liquid starts circulating in the irradiation chamber and being dispensed through the fluid connector and its package as illustrated in FIGS. 5 and 6.

The liquid volume is controlled in test 70 such by a flow meter (not shown in the figures). When the desired volume is achieved, the pump is powered off in step 71. The pusher 45 of the actuation mechanism is then retracted in step 72 which forces the fluid connector to return to its storage position of FIG. 7. The valve 24 is then closed in step 73. Steps 72 and 73 can be run almost simultaneously to avoid liquid leakage. Then, the UV lamp can be powered off in step 74.

Figure 7:
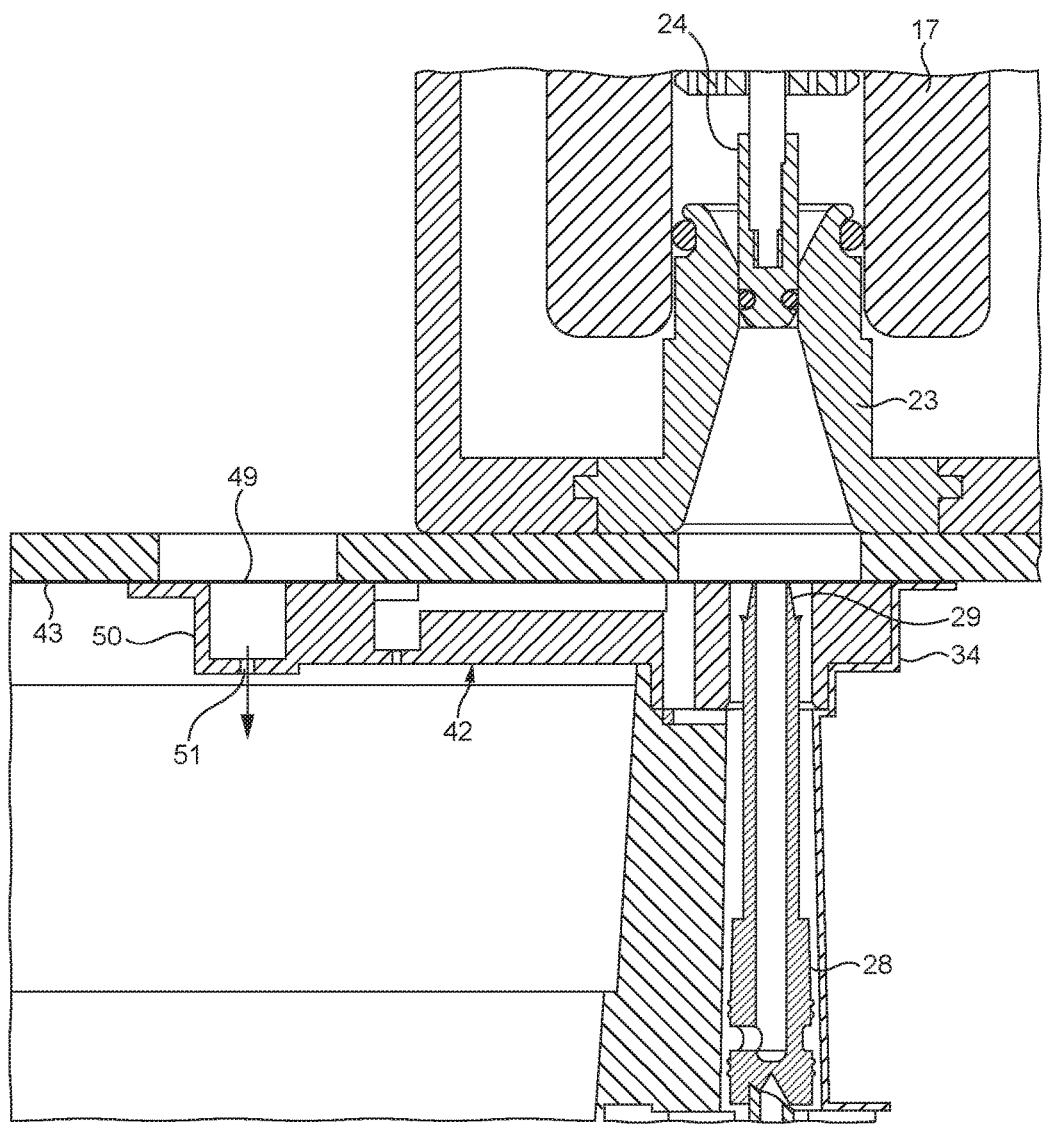
FIG. 7 represents a part of the apparatus in emptying mode by pressurized air.
Figure 8:
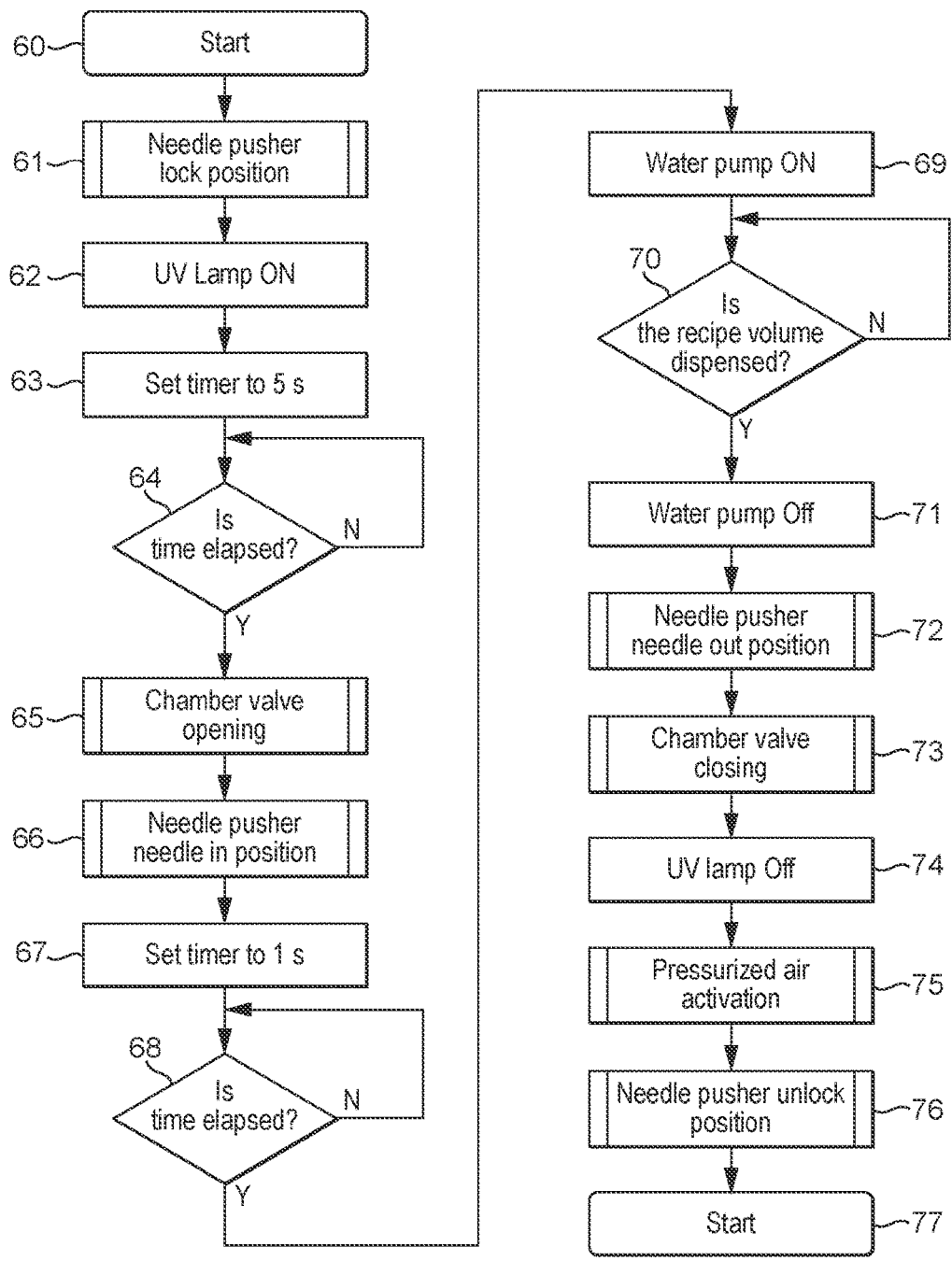
FIG. 8 represents a chart of an example of method for preparing a beverage in the apparatus of the present disclosure.

In the next steps (which can be optional), pressurized air is supplied to the package via the air circuit as illustrated in FIG. 7. In step 75, the air pump is activated to supply air. Then, in step 76, the actuation mechanism retracts the pusher 45 in rest position of FIG. 2 to enable the used package to be removed. The operation is ended in step 77 and ready to be repeated.

Additional controls can be implemented in the apparatus to further provide a secured operation. For example, liquid conductivity can be measured in the irradiation chamber 14 before starting the UV treatment. For this, conductivity can be measured between the bushing 23 and the ground electrode 25.

The relative orientation of the liquid supply and treatment unit 8 relative to the package 2 can be varied. In the present example, the unit 8 and spout 27 of the package are oriented vertically. However, a horizontal orientation or inclined orientation is also possible. In addition, the package may take various forms and the spout may be positioned relative to the compartment at a different location. For example, the spout could be part of the lid rather than be adjacent to the product compartment.

Although the present disclosure has been described by way of example, it should be appreciated that variations and modifications may be made without departing from the scope of the present disclosure as defined in the claims. Furthermore, where known equivalents exist to specific features, such equivalents are incorporated as if specifically referred in this specification.

The invention claimed is:

1. An apparatus for preparing a beverage by delivering sanitized liquid within a package containing nutritional ingredients, the apparatus comprising:
   a package comprising a product compartment containing nutritional ingredients and a spout arranged for the supply of liquid inside the compartment; and
   a machine comprising:
      a control unit; and
      a liquid supply and treatment unit comprising an optical irradiation chamber arranged for sanitizing liquid circulating therein and a connection assembly for fluidly connecting the liquid supply and treatment unit with the package;
   wherein the spout comprises a fluid connector, with a liquid inlet, insertable through the connection assembly of the liquid supply and treatment unit; and
   wherein the fluid connector is positioned after insertion through the connection assembly in a position of insertion in which the liquid inlet is exposed to the optical irradiation field produced by the optical irradiation chamber.

2. The apparatus according to claim 1, wherein the liquid inlet is arranged at the tip of the fluid injector.

3. The apparatus according to claim 1, wherein the optical irradiation chamber comprises a tube for liquid to pass there-through and being irradiated from outside by an irradiating member.

4. The apparatus according to claim 3, wherein the irradiating member is at least one UV lamp or LED.

5. The apparatus according to claim 3, wherein the connection assembly comprises a bushing for the liquid connector to be inserted through, and wherein the fluid connector and bushing are designed and dimensioned relative to one another such that at least the tip of the fluid connector is positioned after insertion in a position in which at least the tip of the fluid connector is exposed to an optical irradiation field produced by the optical irradiation chamber.

6. The apparatus according to claim 5, wherein the bushing is positioned through an outlet end of the tube and the tube comprising at least one liquid inlet at an inlet end.

7. The apparatus according to claim 5, wherein a movable valve is provided to fluidly close the bushing when the fluid connector is not inserted through the connection assembly and fluidly open the bushing for insertion of the fluid connector through the connection assembly.

8. The apparatus according to claim 7, wherein said valve is also exposed when moved in opening of the bushing to the optical irradiation field produced by the optical irradiation chamber.

9. The apparatus according to claim 5, wherein the bushing comprises at least one annular sealing surface portion snug fitted to a complementary sealing surface portion of the fluid connector for providing a liquid-tight sealing engagement of the fluid connector when the fluid connector is inserted through the connection assembly and, optionally, a flared surface portion that extends from the sealing surface portion towards the inside of the optical irradiation chamber; such flared surface portion forming a reflecting surface disengaged from the tip of the fluid connector.

10. The apparatus according to claim 8, wherein the fluid connector comprises at least one liquid outlet which matches with a liquid inlet of the housing and/or a guiding insert when the fluid connector is placed into the treatment or insertion position; said liquid inlet communicating with the product compartment of the package via a liquid conduit to provide liquid communication between the liquid supply and treatment unit and the product compartment.

11. The apparatus according to claim 1, wherein the spout comprises a housing which is arranged with the fluid connector to guide the fluid connector in displacement between a storage position in which the fluid connector is sealingly enclosed within the housing and an insertion position in which the fluid connector extends beyond the housing for enabling at least the tip of the fluid connector to be exposed to the optical irradiation chamber.

12. The apparatus according to claim 1, wherein the machine further comprises a liquid reservoir, a liquid pump and a control unit for controllably supplying liquid to the liquid supply and treatment unit.

13. The apparatus according to claim 1, wherein the machine further comprises a pressurized air pump and an air injector to inject air into the product compartment for emptying the product compartment from supplied liquid.

14. A method for preparing a beverage according to the apparatus of claim 1, wherein the liquid supply and treatment unit is arranged to irradiate liquid with UV radiation as liquid passes through the unit and wherein the method comprises irradiating at least the tip of the fluid connector when inserted through the connection assembly of the supply and treatment unit.

15. The method according to claim 14, wherein the method comprises maintaining the irradiation chamber closed and controllably irradiating liquid in the chamber for a controlled period of time before insertion of the fluid connector.

* * * * *